US005665793A

United States Patent [19]
Anders

[11] Patent Number: 5,665,793
[45] Date of Patent: Sep. 9, 1997

[54] PHOSPHORESCENT HIGHWAY PAINT COMPOSITION

[76] Inventor: Irving Anders, 54 Crossway, Scarsdale, N.Y. 10583

[21] Appl. No.: 625,096

[22] Filed: Apr. 1, 1996

Related U.S. Application Data

[60] Continuation-in-part of Ser. No. 525,850, Sep. 8, 1995, abandoned, which is a division of Ser. No. 257,350, Jun. 9, 1994, Pat. No. 5,472,737.

[51] Int. Cl.$^6$ .................... F21V 7/22; C08K 3/10
[52] U.S. Cl. ............... 523/172; 252/301.36; 524/403; 524/434; 524/436; 524/437
[58] Field of Search ................. 524/436, 437, 524/403, 434; 523/172; 252/301.36

[56] References Cited

U.S. PATENT DOCUMENTS

| | | | |
|---|---|---|---|
| 223,050 | 8/1879 | Krause | 252/462.1 |
| 274,415 | 3/1883 | Trotter, Jr. | 252/301.36 |
| 1,407,534 | 2/1922 | Hering | 252/301.36 |
| 1,637,963 | 8/1927 | Sauvage | 252/301.36 |
| 2,436,182 | 2/1948 | Schmidling | 252/301.36 |
| 4,172,063 | 10/1979 | O'Brill | 524/5 |
| 5,424,006 | 6/1995 | Murayama et al. | 252/301.4 R |

OTHER PUBLICATIONS

Technical Bulletin for Lumi Nova® dated Dec. 11, 1995 distributed by United Mineral & Chemical Corp.

*Primary Examiner*—Peter A. Szekely
*Attorney, Agent, or Firm*—Lackenbach Siegel Marzullo Aronson & Greenspan, P.C.

[57] ABSTRACT

The present invention relates to novel compositions useful, for example, in water-based paints. The compositions contain a moisture sensitive luminescent substance (for example a phosphorescent substance having increased brightness and longer lasting afterglow) and a polyurethane resin which is water miscible or soluble, and which imparts moisture stability to the luminescent substance. As a result, this novel composition when used in, for example, water-based highway paints imparts an extended road surface life, and is environmentally friendly because it does not contaminate the surrounding environment with organic hydrocarbon products via vaporization or runoffs. In addition this paint composition may be used both indoors and outdoors for nighttime marking.

14 Claims, No Drawings

PHOSPHORESCENT HIGHWAY PAINT COMPOSITION

This application is a continuation-in-part application of and my U.S. patent application Ser. No. 08/525,850, filed Sep. 8, 1995, (now abandoned) entitled "Phosphorescent Highway Paint Composition", which in turn is a division of U.S. Ser. No. 08/257,350, filed Jun. 9, 1994, now U.S. Pat. No. 5,472,737, issued Dec. 5, 1995.

BACKGROUND OF THE INVENTION

1. Field of the Invention

The present invention relates to compositions useful, for example, in water-based paints. The compositions contain a moisture sensitive luminescent substance (for example a phosphorescent substance having increased brightness and longer lasting afterglow) and a polyurethane resin which is water miscible or soluble, and which imparts moisture stability to the luminescent substance. As a result, the composition when used in water-based paints imparts an extended road surface life, and is environmentally friendly because it does not contaminate the surrounding environment with organic hydrocarbon products via vaporization or runoffs. In addition this paint composition may be used both indoors and outdoors for nighttime marking.

2. Background Art

It is presently desirable to produce indoor and outdoor luminescent paints whose compositions do not require organic solvents whose vapors are undesirable when released into the atmosphere and contaminate the surrounding soil or land near roadway surfaces via runoffs. U.S. Pat. No. 4,172,063 discloses an abrasion resistant reflective marking composition containing cement, a fluorescent pigment, silica, glass fibers and a timing bonding acrylic polymer agent. This composition is, however, not environmentally friendly nor does it exhibit any sustained lasting afterglow or extended durability or weatherability.

The term "luminescence" as used in this specification and in the appended claims is meant to be that property of a material which causes visible light to be continued to be emitted after an exciting light source has been removed as well as that property of a material to glow under a source of light of low visibility and suitable wavelength. U.S. Pat. Nos. 223,050; 274,415; 1,407,534 and 1,637,963 disclose the use of luminous (phosphorescent) compositions in paint, enamels, and as a coloring in paper. These luminous or phosphorescent materials exhibit reduced or degraded light resistance over time. A paint mixture with an acrylic vehicle but having an alkaline earth phosphor other than zinc sulfide, which could be modified by replacing its alkaline earth phosphor with zinc sulfide to obtain a preferred phosphorescent paint is described in U.S. Pat. No. 2,436,182. All of these cited references are incorporated in their entirety herein.

As is well-known, fluorescent paints when excited by a source of light produce an emission of light but the light emission is limited to the period of excitation. Such paints can be selected to provide a day time coloration which will demarcate and emphasize areas to be marked such as edges of steps, corners of walls, highway edges and median traffic divider stripes.

Phosphorescent paints on the other hand, once they have been excited, remain luminous with a soft, slowly decaying emission or radiation. Such phosphorescent paints can generate a useful level of luminous flux for periods of time (even several hours) after being activated when exposed to sunlight or artificial light (such as from headlights of automobiles) in the dark of night. After an initial exposure to a light source, luminescence can be renewed by once again exposing the paints to either a natural or an artificial light. Thus, highway paints have incorporated fluorescent or phosphorescent substances to demarcate the edges of highways and the median line of the highway to differentiate the different directions of the highway vehicles. Previously phosphorescent containing highway paints tended to lose their luminescence through chemical attack by the atmosphere (ultraviolet radiation and/or presence of moisture) on the phosphor. In such outdoor uses, the luminescent paint compositions lost most of their phosphorescence capacity in a matter of days.

U.S. Pat. No. 5,424,006 disclosures phosphorescent phosphors which can be utilized both indoors and outdoors as a nighttime display and show extremely long afterglow characteristics. However, these phosphorescent phosphors must be incorporated into chemical hydrocarbon solvent based systems as they are adversely affected by moisture or aqueous systems. This reference is incorporated by reference in its entirety.

Luminescent (phosphorescent) highway paint compositions should have the following characteristics: ease of application, short track time, long wearability, moisture stable (insensitive) luminescent pigment and suitably long duration of afterglow luminescence. Of these, the most difficult to achieve is long wearability under normal traffic conditions and long duration of afterglow luminescence. Accordingly, it is a principal object of the present invention to provide a composition suitable for use in highway or roadway paint that is environmentally protective, exhibits long duration afterglow luminescence and has increased roadway life and durability, and is stable to the detrimental effects of moisture as well as ultraviolet radiation.

Other objects of the present invention, as well as particular features, elements, and advantages thereof, will be elucidated in, or be apparent from, the following description of the invention.

SUMMARY OF THE INVENTION

Now it has been discovered that environmentally friendly and energy saving water-based highway paints can be produced which have the desired characteristics of ease of application, short track time, suitable long duration and higher intensity of afterglow luminescence as well as the most desired characteristic of extended service wear time under traffic conditions even when subjected to the detrimental factors of ultraviolet radiation and/or moisture.

The present invention achieves the above objects, among others, by providing a composition suitable for use in water-based highway or roadway paints comprising a moisture sensitive luminescent substance such as a phosphorescent phosphor or a combination of a phosphorescent phosphor and a fluorescent material and a polyurethane resin which is water compatible. Surprisingly, when this water compatible polyurethane resin is admixed with the water sensitive luminescent substance, the resulting mixture protects the luminescent substance from being attacked by the moisture in the air and the water in a water-based paint composition. Thus, the luminescent substance is protected immediately after being mixed with the polyurethane resin in the paint composition.

While the luminescent substance and the polyurethane resin may be added directly to a paint composition, in a preferred embodiment a premixture is formed by mechanically mixing small incremental amounts of the luminescent substance with the water compatible/miscible polyurethane resin to thoroughly coat the luminescent substance with the polyurethane resin. The formation of the premixture permits even distribution of the luminescent particles within the polyurethane resin and assures that all or most of the particles are coated. This premixture may be stored or immediately added to and mixed with water-based paint compositions with adequate mechanical mixing to insure high integration and distribution of the premixture throughout the paint composition. The paint composition so produced may be sealed and stored until ready to be used. At the time it is to be used the highway paint composition should be mixed mechanically again with conventional means.

After applying a paint containing this novel composition to a surface, upon drying, the composition imparts wearability to the surface such as resistance to surface wear by tires of motor vehicles using the roadway and thus provides an extended surface life. Thus, highway or roadway marking paints can be produced which provide pavement markings and patterns in accordance with state traffic regulations (e.g. New York State, Manual of Uniform Traffic Control devices [MUTCD]). These paints are used for marking lines in the path of traffic as well as those marking patterns located out of the general path of traffic.

The luminescent substance in the composition of the invention may be either a moisture sensitive phosphorescent substance (such as a phosphorescent phosphor oxide type or a combination of a phosphorescent and a fluorescent substance. The preferred luminescent substance contains phosphorescent phosphors which exhibit extremely long duration of afterglow such as for example those phosphorescent phophors (disclosed in U.S. Pat. No. 5,424,006) which comprise a compound expressed by the matrix $MAl_2O_4$ in which M is at least one metal element selected from the group consisting of calcium, strontium and barium or alternatively, is a matrix $MAl_2O_4$ in which M is a plurality of metal elements comprised of magnesium and at least one element selected from the group consisting of calcium, strontium and barium. In a preferred form, 0.001 mol % to 10 mol % of europium may be added to the matrix as an activator, where the mol % is relative to the metal element expressed by M. In another preferred form, 0.001 mol % to 10 mol % of at least one element selected from a group consisting of lanthanium, cerium, praseodymium, neodymium, samarium, gadolinium, terbium, dysprosium, holmium, erbium, thulium, ytterbium, lutetium, manganese, tin and bismuth may be doped to the matrix expressed by $MAl_2O_4$ as a co-activator in terms of mol % relative to the metal element expressed by M. These phosphorescent phosphors are commercially available under the trademark LumiNova® distributed in the United States by United Mineral and Chemical Corporation.

The novel luminescent compositions of the present invention protects and shields the phosphorescent phosphor from the oxidizing action and humidity of the atmosphere, and from moisture. When the luminescent compositions include a combination of a phosphorescent and a fluorescent material, the fluorescent material present in the luminescent substance produces a daytime luminescence or reflectivity or coloration in addition to the phosphorescence produced at night. The operable range for the concentration of phosphorescent substance is from about 1% to about 75%, with a preferred range from about 5% to about 70%, a more preferred range from about 10% to about 65%, and a most preferred range of from about 15% to 60% by volume of the novel luminescent composition.

The novel luminescent compositions of the present invention contain a water miscible or compatible polyurethane resin. The polyurethane resin (e.g. an acrylic urethane resin in either a semi-gloss or gloss) used in the composition is a thermoplastic polymer derived or produced by the reaction of a polyisocyanate such as a diisocyanate (toluene diisocyanate) and a hydroxyl-containing material, for example, a polyol derived from propylene oxide or trichlorobutylene oxide, containing a water soluble group such as hydroxy, carboxylic acid or amine group. The amount of water miscible polyurethane resin (semi-gloss or gloss) used ranges from about 1% to about 80%, with a preferred range from about 3% to about 75%, more preferred from about 5% to about 70%, and a most preferred from about 10% to about 65% by volume of the novel luminescent composition.

The water-based dispersions employed in the present invention also can be used in commercially produced water based paints containing various colors used, for example, in painting highway roadway surfaces including white, yellow, orange, red, blue, and green. These types of paints may for example be used as a highway paint colored with the appropriate highway or roadway colors of such as white (titanium dioxide [ASTM D476, Type II] 100% purity), yellow (medium chrome yellow [ASTM D211, Type III] 100% purity), orange and blue. The water based colored dispersion represents from about 30% to about 98%, a preferred range being from about 40% to about 95%, a more preferred range from about 50% to about 90%, and a most preferred range being from about 55% to about 88% by volume of the water based luminescent paint composition. The composition of the invention, when used in highway paints, prevents or reduces or minimizes the flaking of the exposed surface by the tires of motor vehicles using the roadway, this eliminates the need for an overcoat.

The selection of the amount of luminescent substance, colored paint dispersion, and polyurethane resin from within the ranges discussed above, is effected, for example, by the color of the paint dispersion. Yellow paints require increased amounts of luminescent material in comparison to white paints. The selected ranges permit a careful balance of the water-based luminescent compositions of the invention with other paint ingredients resulting, for example, in a highway paint composition with maximum desirable characteristics for all traffic conditions.

Optionally, a particulate may be used to impart abrasiveness to the paint composition and is either a natural abrasive material such as fine sand, silica, ground marble (white marble preferred), corundum (aluminum oxide, emery), pumice, iron oxide and feldspar. The more important synthetic types are silicon carbide, boron carbide, cerium oxide and fused alumina; or even some reflective substances (for example crushed reflective glass) as long as they will impart an effective abrasiveness to the surface of the dried paint. This abrasiveness reduces the likelihood of skidding by motor vehicles both in clear weather as well as when the surface of the road is wet. The operable range is an additive amount from about 1% to about 15% parts by volume, with a preferred range of about from 1% to about 13%, with from about 1% to about 9% the most preferred.

The surface of the pavement or roadway is prepared to receive the new paint by being swept clean and then air blasted to remove dirt and other residues thereon.

The applicating equipment for the paint is that which is commonly used to paint roadway surfaces, i.e. it shall be maneuverable to the extent that straight lines can be followed and normal curves can be made in a true arc. Other accessories are utilized which allow for marking legends, symbols, crosswalks, and other special patterns. This equipment is normally truck mounted to provide a self-contained pavement marking machine to apply the paint and other desired topical reflective materials such as glass spheres in continuous and skip-line patterns. During application of the water-based luminescent paint compositions of the present invention, the surface temperature of the roadway should be about 50° F. or higher.

DETAILED DESCRIPTION OF THE PREFERRED EMBODIMENTS

Some examples will be given to illustrate the essence of the invention. All the ingredients are set forth as parts by volume unless otherwise indicated.

EXAMPLE 1

A water-based highway paint is produced from the following ingredients:

5 parts of powdered LumiNova®* phosphorescent material;

7 parts of water based acrylic urethane, semi-gloss; and 88 parts of white water-based highway paint.

*LumiNova is a registered trademark. Technical literature—United Mineral & Chemical Corp, Dec. 11, 1995. This publication is incoporated by reference in its entirety.

The phosphorescent phosphor and the acrylic urethane are first separately mixed together at an ambient temperature 73°±5° F. and then mixed with the water-based highway paint. The minimum temperature of the asphalt pavement surface is 50° F. The paint is then sprayed on the pavement surface of a roadway in four inch wide stripes. The surface of the roadway has been swept clean and air blasted to remove dirt and other residues in the areas where the paint is to be applied. The paint is allowed to dry until it is no longer tacky to the touch (a no-tack condition) and this usually occurs in about 30 minutes. It is completely dry in about an hour.

EXAMPLE 2

A water-based highway paint is produced from the following ingredients:

10 parts of powdered LUMINOVA® phosphorescent material;

13 parts of water based acrylic urethane (gloss finish); and 77 parts of yellow water-based highway paint.

The phosphorescent phosphor and the acrylic urethane are first separately mixed together at an ambient temperature 73°±5° F. and then mixed with the water-based highway paint. The minimum temperature of the pavement is 50° F. The paint is then sprayed on the asphalt pavement surface of a roadway in four inch wide stripes. The surface of the roadway has been swept clean and air blasted to remove dirt and other residues in the areas where the paint is to be applied. The paint is allowed to dry until it is no longer tacky to the touch (a no-tack condition) and this usually occurs in about 30 minutes. It is completely dry in about an hour.

EXAMPLE 3

A water-based highway paint is produced from the following ingredients:

10 parts of powdered 80/20 LUMINOVA® phosphorescent/fluorescent material;

13 parts of water based acrylic polyurethane, semi-gloss; and 77 parts of white water based highway paint.

The ingredients are mixed at an ambient temperature of 73°±5° F. The minimum temperature of the pavement is 50° F. The paint is then sprayed on the asphalt pavement surface of a roadway in four inch wide stripes. The surface of the roadway has been swept clean and air blasted to remove dirt and dust and other residues such as oil, grease, and similar foreign materials in the areas where the paint is to be applied. The paint is allowed to dry until it is no longer tacky to the touch (a no-tack condition) and this usually occurs in about 30 minutes. It is completely dry in about an hour.

EXAMPLE 4

A water-based highway paint is produced from the following ingredients:

15 parts of powered 80/20 LumiNova® phosphorescent/fluorescent material mixture;

18 parts of water based acrylic polyurethane, gloss; and 67 parts of yellow water-based highway paint.

The ingredients are mixed at an ambient temperature of 73°±5° F. The minimum temperature of the pavement is 50° F. The paint is then sprayed on the asphalt pavement surface of a roadway in four inch wide stripes. The surface of the roadway has been swept clean and air blasted to remove dirt and other residues in the areas where the paint is to be applied. The paint is allowed to dry until it is no longer tacky to the touch (a no-tack condition) and this usually occurs in about 30 minutes. It is completely dry in about an hour.

| Ingredients | Ex. 5* | Ex. 6* | Ex. 7* |
| --- | --- | --- | --- |
| phosphorescent powder | 7 | 7 | 7 |
| acrylic polyurethane | 9 | 9 | 9 |
| sand (fine) | 15 | 5 | 13 |
| highway paint white | 69 | 79 | 71 |

| Ingredients | Ex. 8* | Ex. 9* | Ex. 10* |
| --- | --- | --- | --- |
| phosphorescent powder | 7 | 7 | 7 |
| acrylic polyurethane | 9 | 9 | 9 |
| sand (fine) | 7 | 9 | 11 |
| highway paint white | 77 | 75 | 73 |

*All parts of these examples are parts by volume.

The ingredients are mixed at an ambient temperature of 73°±5° F. The minimum temperature of the pavement is 50° F. The paint is then sprayed on the asphalt pavement surface of a roadway in four inch wide or wider stripes. The surface of the roadway has been swept clean and air blasted to remove dirt and other residues in the areas where the paint is to be applied. The paint is allowed to dry until it is no longer tacky to the touch (a no-tack condition) and this usually occurs in about 30 minutes. It is completely dry in about an hour depending upon the moisture content of the ambient air. The higher the moisture content of the air, the longer the paint takes to dry completely.

The dried highway paint exhibits greater durability, improved abrasiveness, and the luminescence materials exhibit a longer life and greater intensity by the order of magnitude of 10 than previously known because the polyurethane resin in the paint composition tends to prevent oxidation of the luminescent materials in the paint. Previously luminescent (phosphorescent) materials used outside exhibited a useful life of a minimum of days before degradation is obvious. The current effective useful life of luminescent materials in the paint composition of the present invention has no minimum and is now a function of the longivity and/or wearability of the paint composition itself.

The durability of the paint on the roadway is also greatly increased due to the polyurethane resin and the abrasive in the paint reduces the tendency of vehicles driving over the paint to skid, a marked safety factor.

When it is desirable to have reflectorized highway markings or to increase the reflectivity of the highway paint, reflective glass beads (fine glass spheres) are injected into or dropped onto the surface of the wet paint on the roadway surface manually or by a suitable mechanical device (such as a sprinkler) at the rate of 20 to 25 pounds per gallon of mating. Insufficient glass bead coverage or inadequate glass bead retention are to be avoided. Excessive glass bead coverage is also to be avoided as it would reduce the effective afterglow quality by scattering the energizing light prior to it activating the phosphors. Approximately about ten percent of the reflective beads applied to the painted surface adhere to the wet surface of the paint.

All necessary spray equipment, mixers, compressors and other appurtenances for the placement of the luminescent highway paint or reflectorized highway pavement markings are well known in the prior art.

When reflective glass spheres are used with the highway paint of the invention and due to wear are worn off the surface of the paint (since the glass spheres are considered a topical coating), the reflectivity of the paint is still present because of the luminescent material in the paint which has not been removed and continues to be present until the paint is completely worn away or physically removed.

It will thus be seen that the objects set forth above, among those elucidated in, or made apparent from, the preceding description, are efficiently attained and, since certain changes may be made in the above composition without departing from the scope of the invention, it is intended that all matter contained in the above description shall be interpreted as illustrative only and not in a limiting sense.

While the water based paint composition of the present invention is directed toward application to roadway surfaces, including both roadway pavement writing and markings, it could also be used on overhead road and shoulder signs. In such applications as these an aggregate such as crushed reflective glass beads or fine whim marble would be used in an additive amount in the paint composition to enhance the reflectivity of the paint.

It is also to be understood that the following claims are intended to cover all of the generic and specific features of the invention herein described and all statements of the scope of the invention which, as a matter of language, might be said to fall therebetween.

I claim:

1. A luminescent composition comprising:
   a luminescent substance comprising a compound expressed by the matrix $MAl_2O_4$ in which M is at least one metal element selected from the group consisting of calcium, strontium and barium or alternatively, is a matrix $MAl_2O_4$ in which M is a plurality of metal elements comprised of magnesium and at least one element selected from the group consisting of calcium, strontium and barium; and a water miscible polyurethane resin.

2. The composition of claim 1, containing a fluorescent substance.

3. A luminescent paint composition comprising:
   a luminescent substance comprising a compound expressed by the matrix $MAl_2O_4$ in which M is at least one metal element selected from the group consisting of calcium, strontium and barium or alternatively, is a matrix $MAl_2O_4$ in which M is a plurality of metal elements comprised of magnesium and at least one element selected from the group consisting of calcium, strontium and barium; a water miscible polyurethane resin; and a water-based colored paint dispersion.

4. The composition of claim 3, containing a fluorescent substance.

5. A method of producing a water miscible luminescent composition which comprises, admixing a luminescent substance expressed by the matrix $MAl_2O_4$ in which M is at least one metal element selected from the group consisting of calcium, strontium and barium or alternatively, is a matrix $MAl_2O_4$ in which M is a plurality of metal elements comprised of magnesium and at least one element selected from the group consisting of calcium, strontium and barium; with a water miscible polyurethane resin.

6. A method of producing a water miscible luminescent paint composition which comprises admixing a luminescent substance expressed by the matrix $MAl_2O_4$ in which M is at least one metal element selected from the group consisting of calcium, strontium and barium or alternatively, is a matrix $MAl_2O_4$ in which M is a plurality of metal elements comprised of magnesium and at least one element selected from the group consisting of calcium, strontium and barium; with a water miscible polyurethane resin to form a water miscible luminescent composition; and admixing the water miscible luminescent composition with a water-based paint composition.

7. The composition of claim 1 containing europium as an activator.

8. The composition of claim 7 in which the concentration of the activator is from about 0.001 mol % to about 10 mol %, the mol % being relative to the metal element expressed by M.

9. The composition of claim 7 containing a co-activator selected from the group consisting of lanthanium, cerium, praseodymium, neodymium, samarium, gadolinium, terbium, dysprosium, holmium, erbium, thulium, ytterbium, lutetium, manganese, tin and bismuth.

10. The water-based luminescent paint composition of claim 2 containing europium as an activator.

11. The water-based luminescent paint composition of claim 10 in which the concentration of the activator is from about 0.001 mol % to about 10 mol %, the mol % being relative to the metal element expressed by M.

12. The water-based luminescent paint composition of claim 11 containing a co-activator selected from the group consisting of lanthanium, cerium, praseodymium, neodymium, samarium, gadolinium, terbium, dysprosium, holmium, erbium, thulium, ytterbium, lutetium, manganese, tin and bismuth.

13. The water-based luminescent paint composition of claim 2 wherein the color of the paint dispersion is selected from the group consisting of white, yellow, orange, blue, red and green.

14. The water-based luminescent paint composition of claim 2 containing in an additive amount an abrasive particulate selected from the group consisting of a natural abrasive material and a synthetic abrasive material.

* * * * *